United States Patent
Kawano et al.

(10) Patent No.: US 9,535,246 B2
(45) Date of Patent: Jan. 3, 2017

(54) OPTICAL SCANNING DEVICE, IMAGE FORMING APPARATUS, AND METHOD FOR ASSEMBLING OPTICAL SCANNING DEVICE

(71) Applicant: CANON KABUSHIKI KAISHA, Tokyo (JP)

(72) Inventors: Tomoyuki Kawano, Mishima (JP); Mitsuhiro Obara, Suntou-gun (JP); Junya Azami, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/799,336

(22) Filed: Jul. 14, 2015

(65) Prior Publication Data

US 2016/0018638 A1 Jan. 21, 2016

(30) Foreign Application Priority Data

Jul. 16, 2014 (JP) ................................. 2014-146037
May 27, 2015 (JP) ................................. 2015-107879

(51) Int. Cl.
| | | |
|---|---|---|
| G03G 15/00 | (2006.01) | |
| G02B 26/12 | (2006.01) | |
| G03G 15/04 | (2006.01) | |
| G03G 21/16 | (2006.01) | |

(52) U.S. Cl.
CPC ....... *G02B 26/123* (2013.01); *G03G 15/04072* (2013.01); *G03G 21/1666* (2013.01)

(58) Field of Classification Search
CPC ........................ G02B 26/123; G03G 15/04072
USPC ............................................................ 399/4
See application file for complete search history.

(56) References Cited

U.S. PATENT DOCUMENTS

| | | | | |
|---|---|---|---|---|
| 6,691,859 B2* | 2/2004 | Weber | .................. | H01R 43/205 198/464.3 |
| 2008/0084467 A1* | 4/2008 | Satou | ....................... | B41J 2/473 347/132 |
| 2013/0063798 A1* | 3/2013 | Takamatsu | ............. | G02B 26/12 359/198.1 |
| 2013/0067736 A1* | 3/2013 | Peng | ...................... | H05K 1/182 29/741 |

FOREIGN PATENT DOCUMENTS

| | | | |
|---|---|---|---|
| JP | 2001-100128 A | 4/2001 | |
| JP | 2002-344060 A | 11/2002 | |
| JP | 5132087 B2 | 1/2013 | |
| JP | 2014-013349 A | 1/2014 | |

(Continued)

*Primary Examiner* — David Gray
*Assistant Examiner* — Tyler Hardman
(74) *Attorney, Agent, or Firm* — Canon U.S.A., Inc. IP Division

(57) ABSTRACT

Six first holes into which lead pins of a first semiconductor laser are inserted are arranged to form a parallelogram having line segments each connecting two first holes arranged in an X direction as first short sides, and line segments each connecting three first holes arranged in an intersecting direction intersecting with the X direction as first long sides. Six second holes into which lead pins of a second semiconductor laser are inserted are arranged to form a parallelogram having line segments each connecting two second holes arranged in the X direction as second short sides, and line segments each connecting three second holes arranged in the intersecting direction intersecting with the X direction as second long sides.

2 Claims, 19 Drawing Sheets

(56) References Cited

FOREIGN PATENT DOCUMENTS

| JP | 2014013349 A | * | 1/2014 |
| JP | 2014-044370 A | | 3/2014 |
| JP | 2014044370 A | * | 3/2014 |

* cited by examiner

VIEW FROM REAR SIDE OF FIG. 1

OPTICAL SCANNING DEVICE, IMAGE FORMING APPARATUS, AND METHOD FOR ASSEMBLING OPTICAL SCANNING DEVICE

BACKGROUND OF THE INVENTION

Field of the Invention

The present invention relates to an image forming apparatus that forms an image on a recording material by an electrophotographic process, such as a laser beam printer (LBP), a copying machine, and a facsimile, and an optical scanning device that is provided in the image forming apparatus.

Description of the Related Art

An optical scanning device uses a semiconductor laser as a light emitting member. Japanese Patent Application Laid-Open No. 2001-100128 discuses a configuration in which a plurality of lead pins of a semiconductor laser is inserted into holes in a substrate and electrically connected to a circuit formed on the substrate.

Japanese Patent No. 5132087 discusses an optical scanning device in which a plurality of semiconductor lasers is closely arranged to form a color image.

Suppose that a plurality of semiconductor lasers is configured to be closely arranged as discussed in Japanese Patent No. 5132087 and lead pins are configured to be inserted into holes formed in a substrate as discussed in Japanese Patent Application Laid-Open No. 2001-100128. In such a case, the respective lead pins of the plurality of semiconductor lasers may be configured to be inserted into a single substrate.

In some cases, the plurality of semiconductor lasers sometimes needs to be arranged even closer to satisfy optical requirements. If the plurality of holes into which the lead pins are inserted is formed in a substrate, the holes need to be separated by a predetermined distance or more in consideration of the arrangement of a circuit pattern on the substrate. The close arrangement of the plurality of semiconductor lasers is thus limited in view of the arrangement of the holes into which the lead pins are inserted. In particular, if a single semiconductor laser includes a plurality of laser emitting units capable of independent control, the number of lead pins formed on the single semiconductor laser increases. In particular, a semiconductor laser including four laser emitting units includes six lead pins. Such semiconductor lasers are even more difficult to closely arrange.

SUMMARY OF THE INVENTION

The present invention is directed to a technique of closely arranging light emitting members each having six lead pins.

The present invention is further directed to an optical scanning device with improved assemblability.

The present invention is further directed to a simple method for assembling an optical scanning device.

According to an aspect of the present invention, an optical scanning device includes first and second light emitting members each including four laser emitting units and six lead pins, a substrate including six first holes in which the six lead pins of the first light emitting member are respectively inserted, and six second holes in which the six lead pins of the second light emitting member are respectively inserted, and a deflection scanning unit configured to reflect light emitted from the first light emitting member and light emitted from the second light emitting member to perform deflection scanning, wherein, in a case where the substrate is viewed in a direction orthogonal to a surface of the substrate, an arrangement direction of the first light emitting member and the second light emitting member is parallel to a direction corresponding to a main scanning direction, and wherein on the surface of the substrate, the six first holes are arranged to form a parallelogram having line segments each connecting two of the first holes arranged in the direction corresponding to the main scanning direction as first short sides, and line segments each connecting three of the first holes arranged in an intersecting direction intersecting with the direction corresponding to the main scanning direction as first long sides, and the six second holes are arranged to form a parallelogram having line segments each connecting two of the second holes arranged in the direction corresponding to the main scanning direction as second short sides, and line segments each connecting three of the second holes arranged in the intersecting direction as second long sides.

According to another aspect of the present invention, an optical scanning unit includes first and second light emitting members each including four laser emitting units and six lead pins, a substrate including six first holes in which the six lead pins of the first light emitting member are respectively inserted, and six second holes in which the six lead pins of the second light emitting member are respectively inserted, and a deflection scanning unit configured to reflect light emitted from the first light emitting member and light emitted from the second light emitting member to perform deflection scanning, wherein, in a case where the substrate is viewed in a direction orthogonal to a surface of the substrate, an arrangement direction of the first light emitting member and the second light emitting member is parallel to a direction corresponding to a sub scanning direction, and wherein on the surface of the substrate, the six first holes are arranged to form a parallelogram having line segments each connecting two of the first holes arranged in the direction corresponding to the sub scanning direction as first short sides, and line segments each connecting three of the first holes arranged in an intersecting direction intersecting with the direction corresponding to the sub scanning direction as first long sides, and the six second holes are arranged to form a parallelogram having line segments each connecting two of the second holes arranged in the direction corresponding to the sub scanning direction as second short sides, and line segments each connecting three of the second holes arranged in the intersecting direction as second long sides.

According to yet another aspect of the present invention, an optical scanning device includes a light emitting member including four or more laser emitting units and six or more lead pins, a laser driving substrate including six or more holes into which the six or more lead pins are respectively inserted, and a deflection scanning unit configured to reflect a laser beam emitted from the light emitting member to perform deflection scanning, wherein all the six or more holes into which the six or more lead pins are inserted are arranged to be located at intersections of virtual coordinates including at least two mutually-parallel first virtual straight lines and at least two mutually-parallel second virtual straight lines intersecting with the first virtual straight lines, and wherein all the six or more holes are arranged so that one of the six or more holes and any of other holes located at coordinates different from coordinates where the one hole is located, in both a first direction in which the first virtual straight lines are arranged and a second direction in which the second virtual straight lines are arranged, do not overlap in either of the first and second directions.

According to yet another aspect of the present invention, an optical scanning device includes first and second light emitting members each including two or more laser emitting units and four or more lead pins, a laser driving substrate including eight or more holes into which the four or more lead pins of the first light emitting member and the four or more lead pins of the second light emitting member are respectively inserted, and a deflection scanning unit configured to reflect laser beams respectively emitted from the first and second light emitting members to perform deflection scanning, wherein all the eight or more holes into which the eight or more lead pins are inserted are arranged to be located at intersections of virtual coordinates including at least two mutually-parallel first virtual straight lines and at least two mutually-parallel second virtual straight lines intersecting with the first virtual straight lines, and wherein all the eight or more holes are arranged so that one of the eight or more holes and any of other holes located at coordinates different from coordinates where the one hole is located, in both a first direction in which the first virtual straight lines are arranged and a second direction in which the second virtual straight lines are arranged, do not overlap in either of the first and second directions.

According to yet another aspect of the present invention, a method for assembling an optical scanning device includes holding first and second light emitting members on a housing of the optical scanning device, chucking all lead pins of the first light emitting member and the second light emitting member by slits of a first tool moving in a first direction, chucking all the lead pins of the first light emitting member and the second light emitting member by slits of a second tool moving in a second direction intersecting with the first direction, inserting all the lead pins of the first light emitting member and the second light emitting member that are in a state of being chucked by the first and second tools, into respective holes provided in a laser driving substrate, and retracting the first and second tools from all the lead pins.

Further features of the present invention will become apparent from the following description of exemplary embodiments with reference to the attached drawings.

DESCRIPTION OF THE EMBODIMENTS

[Image Forming Apparatus]

Figure 1:
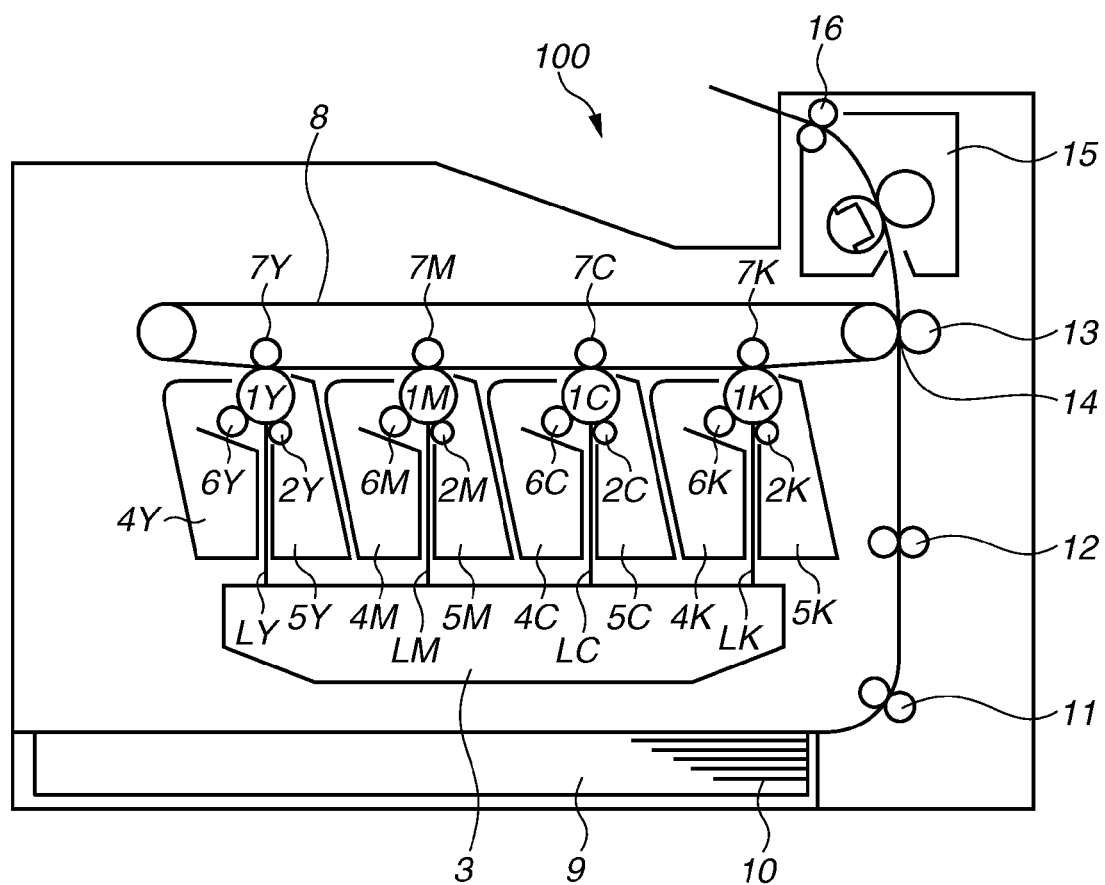
FIG. 1 is a schematic sectional view of an image forming apparatus.

FIG. 1 is an explanatory sectional view illustrating a configuration of an image forming apparatus according to a first exemplary embodiment. An image forming apparatus 100 illustrated in FIG. 1 is an electrophotographic color image forming apparatus which includes developers (toner) of four colors including yellow Y, magenta M, cyan C, and black K, and forms a toner image on a recording material 10.

In FIG. 1, when performing image formation, photosensitive drums 1 (1Y, 1M, 1C, and 1K) serving as photosensitive members rotate clockwise to go through the following process. Surfaces of the photosensitive drums 1Y, 1M, 1C, and 1K are uniformly charged by charging rollers 2 (2Y, 2M, 2C, and 2K) serving as charging units, and irradiated with laser beams LY, LM, LC, and LK from an optical scanning device 3 serving as an exposure unit. The laser beams LY, LM, LC, and LK are emitted from the optical scanning device 3 based on image data corresponding to the respective colors. As a result, electrostatic latent images corresponding to the image data are formed on the surfaces of the photosensitive drums 1. Developing rollers 6Y, 6M, 6C, and 6K in developing devices 4Y, 4M, 4C, and 4K serving as developing units supply the toner of the respective colors to the electrostatic latent images formed on the surfaces of the photosensitive drums 1Y, 1M, 10, and 1K so that the toner adheres to the respective photosensitive drums 1. The electrostatic latent images are thereby developed to form toner images of the respective colors on the surfaces of the photosensitive drums 1Y, 1M, 1C, and 1K. An intermediate transfer belt 8 serving as an image bearing member is stretched and arranged opposite to the photosensitive drums 1Y, 1M, 1C, and 1K. The toner images of the respective colors formed on the surfaces of the photosensitive drums 1Y, 1M, 1C, and 1K are primarily transferred onto an outer peripheral surface of the intermediate transfer belt 8 in series in an overlapping manner. Such primary transfer is performed by applying a primary transfer bias voltage to primary transfer rollers 7Y, 7M, 7C, and 7K serving as primary transfer units that are arranged on an inner periphery side of the intermediate transfer belt 8.

Recording materials 10 stacked in a sheet cassette 9 are fed by a feed roller 11, and then conveyed by a conveyance roller 12. The recording material 10 is then conveyed to a secondary transfer portion 14 at predetermined timing. The secondary transfer portion 14 includes a nip portion between the intermediate transfer belt 8 and a secondary transfer roller 13 serving as a secondary transfer unit. A secondary transfer bias voltage is applied to the secondary transfer roller 13, whereby the toner images on the outer peripheral surface of the intermediate transfer belt 8 are transferred onto the recording material 10. The recording material 10 is then held between and conveyed by the secondary transfer roller 13 and the intermediate transfer belt 8 of the secondary transfer portion 14, and delivered to a fixing device 15 serving as a fixing unit. The fixing device 15 applies heat and pressure to the toner images, whereby the toner images are fixed onto the recording material 10. The recording material 10 is then conveyed by a discharge roller 16.

[Optical Scanning Device]

Figure 2:
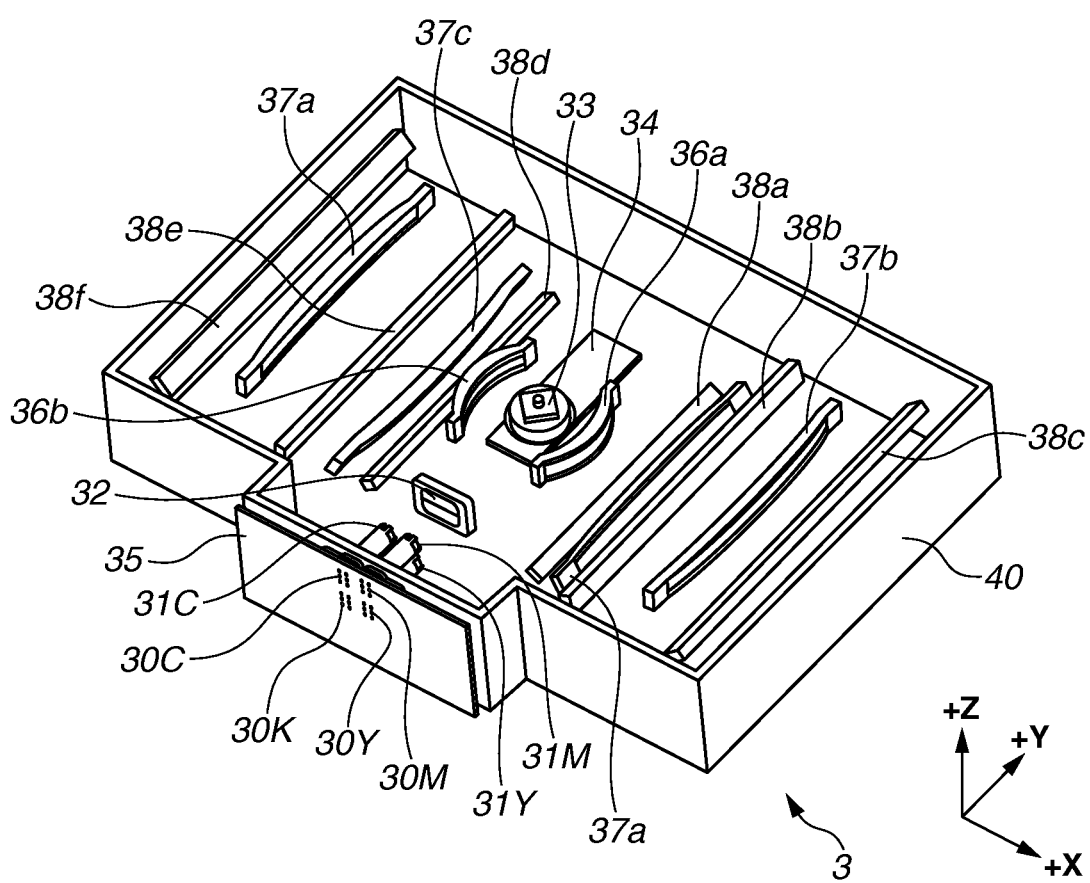
FIG. 2 is a perspective view of an optical scanning device.
Figure 3:
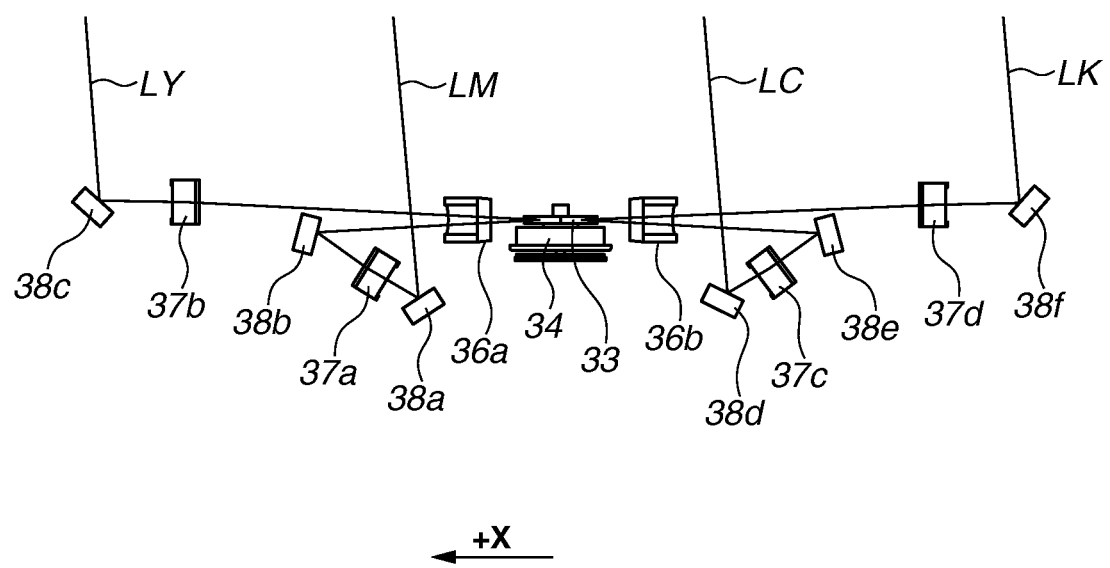
FIG. 3 is a sub scanning sectional view illustrating scanning optical systems.
Figure 4:
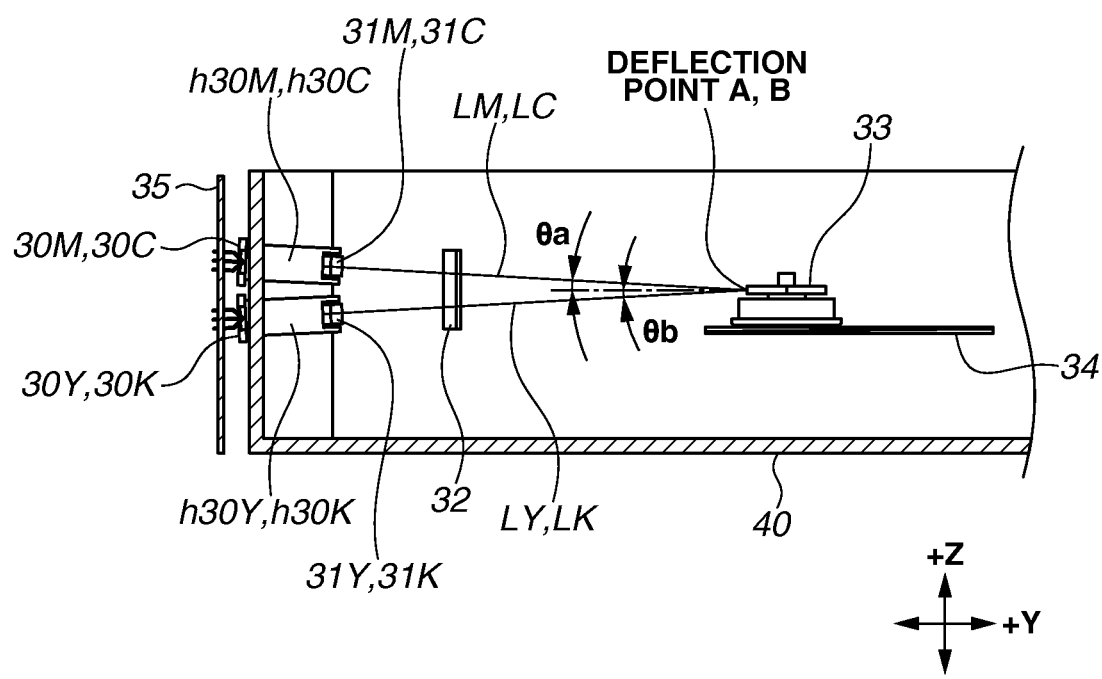
FIG. 4 is a sub scanning sectional view illustrating incident optical systems.

Next, an overall configuration of the optical scanning device 3 will be described with reference to FIGS. 2 to 4. FIG. 2 is a perspective view illustrating the optical scanning device 3. FIG. 3 is a diagram for illustrating scanning optical systems. FIG. 3 is a sub scanning sectional view taken in a +Y direction illustrated in FIG. 2. FIG. 4 is a diagram for illustrating incident optical systems. FIG. 4 is a sub scanning sectional view taken in a +X direction. The Y direction is a main scanning direction, a direction parallel to rotation axes of the photosensitive drums 1 (1Y, 1M, 1C, and 1K). The optical scanning device 3 irradiates the surfaces of the respective photosensitive drums 1 (1Y, 1M, 1C, and 1K) that serve as different irradiated portions (portions to be irradiated), with the corresponding laser beams LY, LM, LC, and LK respectively emitted from semiconductor lasers 30 (30Y, 30M, 30C, and 30K) serving as light emitting members.

As illustrated in FIG. 4, the semiconductor lasers 30Y, 30M, 30C, and 30K serving as light emitting members, which are driven and controlled by a laser driving circuit substrate 35, emit the laser beams LY, LM, LC, and LK. In FIG. 4, the laser beam LM (LC) and a horizontal line (direction parallel to the Y-axis) form an angle $\theta a$. The laser beam LY (LK) and the horizontal line (direction parallel to the Y-axis) form an angle $\theta b$. The semiconductor lasers 30 (30Y, 30M, 30C, and 30K) each include four laser emitting units (light emitting points) capable of independent light emission control. Each semiconductor laser 30 emits four adjoining substantially-parallel light beams. Since the four light beams adjoin each other and are substantially parallel, the four light beams emitted from each of the semiconductor lasers 30Y, 30M, 30C, and 30K will be represented by one light beam, and such representative light beams will be respectively referred to as the laser beams LY, LM, LC, and LK in the following description and the drawings.

The laser beams LY, LM, LC, and LK are divergent beams. The laser beams LY, LM, LC, and LK are converted into collimated laser beams by collimator lens 31Y, 31M, 31C, and 31K. The laser beams LY, LM, LC, and LK are transmitted through a cylindrical lens 32, and thereby converged only in a sub scanning direction and focused on reflection surfaces of a rotating polygonal mirror 33 as line images. The laser beams LY and LM simultaneously enter the same reflection surface of the rotating polygonal mirror 33. The laser beams LC and LK simultaneously enter the same reflection surface of the rotating polygonal mirror 33. Such device configurations constitute the incident optical systems.

The rotating polygonal mirror 33 includes a plurality of reflection surfaces. The rotating polygonal mirror 33 is driven to rotate by a motor 34, and reflects and deflects the laser beams LY, LM, LC, and LK. The laser beams LY and LM reflected by the rotating polygonal mirror 33 are transmitted through a first scanning lens 36a. The laser beam LY is then transmitted through a second scanning lens 37b and reflected by a mirror 38c before focused on the photosensitive drum 1Y as a spot image. On the other hand, the laser beam LM is reflected by a mirror 38b, transmitted through a second scanning lens 37a, reflected by a mirror 38a, and focused on the photosensitive drum 1M.

When the direction in which the laser beams LY and LM are reflected by the rotating polygonal mirror 33 is presumed to be the +X direction, the laser beams LC and LK are reflected in a −X direction. The laser beams LC and LK are transmitted through second scanning lenses 37c and 37d, reflected by mirrors 38d and 38e, and 38f, and focused on the photosensitive drums 1C and 1K, respectively. The laser beams LY and LM and the laser beams LC and LK are reflected by the different reflection surfaces of the rotating polygonal mirror 33 to be radiated onto the corresponding photosensitive drums 1. Such a device configuration constitutes the scanning optical systems.

Such scanning optical systems guide the scanning beams onto the four photosensitive drums 1Y, 1M, 1C, and 1K to perform deflection scanning. Specifically, the rotation of the rotating polygonal mirror 33 changes the angles at which the laser beams LY, LM, LC, and LK are deflected (reflected). As a result, the spot images formed by the laser beams LY, LM, LC, and LK move (main-scan) over the surfaces of the respective photosensitive drums 1Y, 1M, 1C, and 1K in the direction of the rotation axes of the photosensitive drums 1 (main scanning direction). As the photosensitive drums 1Y, 1M, 1C, and 1K rotate, the spot images move (sub-scan) over the surfaces of the respective photosensitive drums 1Y, 1M, 1C, and 1K in a direction orthogonal to the direction of the rotation axes of the photosensitive drums 1 (sub scanning direction). As a result, two-dimensional electrostatic latent images are formed on the surfaces of the photosensitive drums 1. The optical members (the light emitting members, lenses, mirrors, and the rotating polygonal mirror 33) constituting the incident optical systems and the plurality of scanning optical systems are accurately positioned to, supported by, and fixed to an optical box (housing) 40.

[Arrangement of Lead Pin Holes]

Figure 5:
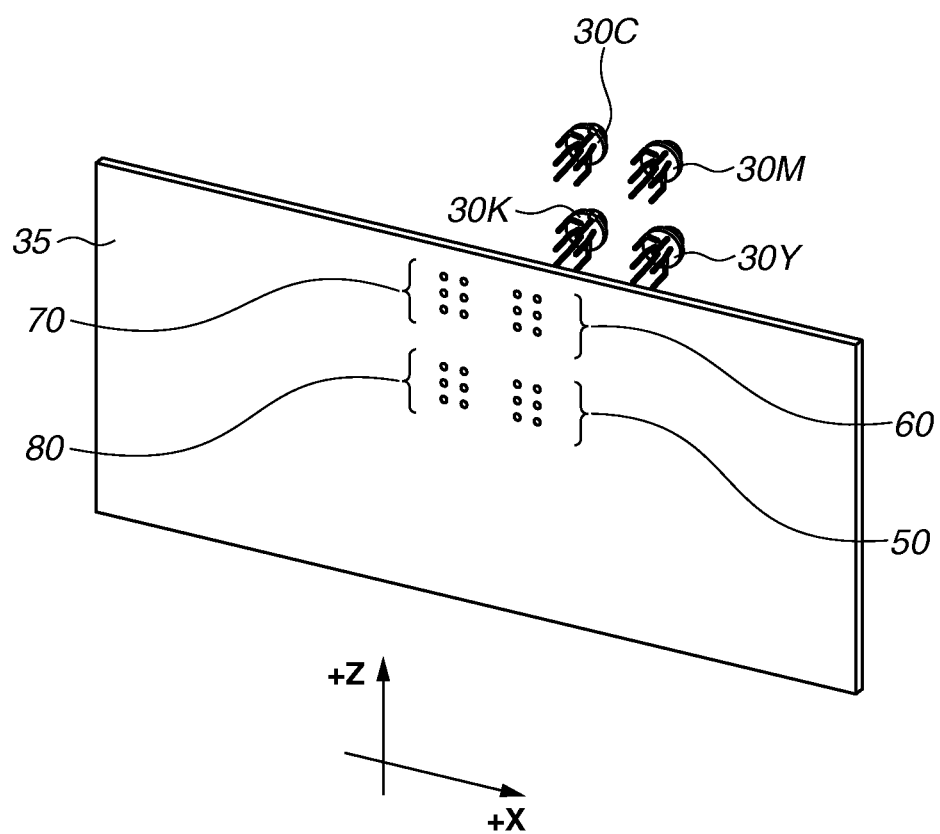
FIG. 5 is a perspective view illustrating a relationship between a laser driving circuit substrate and semiconductor lasers.

Next, a characteristic configuration related to the present exemplary embodiment will be described with reference to FIGS. 5 and 11. FIG. 5 is a perspective view illustrating a relationship between the laser driving circuit substrate 35 and the semiconductor lasers 30. FIG. 5 illustrates a state before lead pins of the semiconductor lasers 30 are inserted into lead pin holes of the laser driving circuit substrate 35.

The laser driving circuit substrate (substrate) 35 includes a circuit (laser driving circuit) to be electrically connected to the lead pins of the semiconductor lasers 30. The laser driving circuit substrate 35 supplies current to the semiconductor lasers 30 via the circuit, thereby causing the laser emitting units of the semiconductor lasers 30 to emit light. Lead pin holes 50 are six through holes into which six lead pins of the semiconductor laser 30Y are inserted. Similarly, lead pin holes 60, 70, and 80 are six through holes into which six lead pins of the corresponding semiconductor lasers 30M, 30C, and 30K are respectively inserted. The six holes of each of the lead pin holes 50, 60, 70, and 80 are aligned in the X and Z directions illustrated in FIG. 5. The surface of the laser driving circuit substrate 35 is in parallel with the X and Z directions. On the surface of the laser driving circuit substrate 35, the X direction corresponds to the main scanning direction, and the Z direction corresponds to the sub scanning direction.

In the present exemplary embodiment, the six holes of each of the lead pin holes 50, 60, 70, and 80 are arranged in two in the X direction and in three in the Z direction. Such an arrangement will be referred to as a 2×3 arrangement. In view of solderability between the lead pins and a circuit pattern and the ease of arrangement of a circuit wiring pattern on the substrate 35, a total of 24 lead pin holes 50, 60, 70, and 80 are arranged apart from each other by a certain distance or more on the surface of the substrate 35.

[Method for Assembling Laser Driving Circuit Substrate 35]

Figure 7:
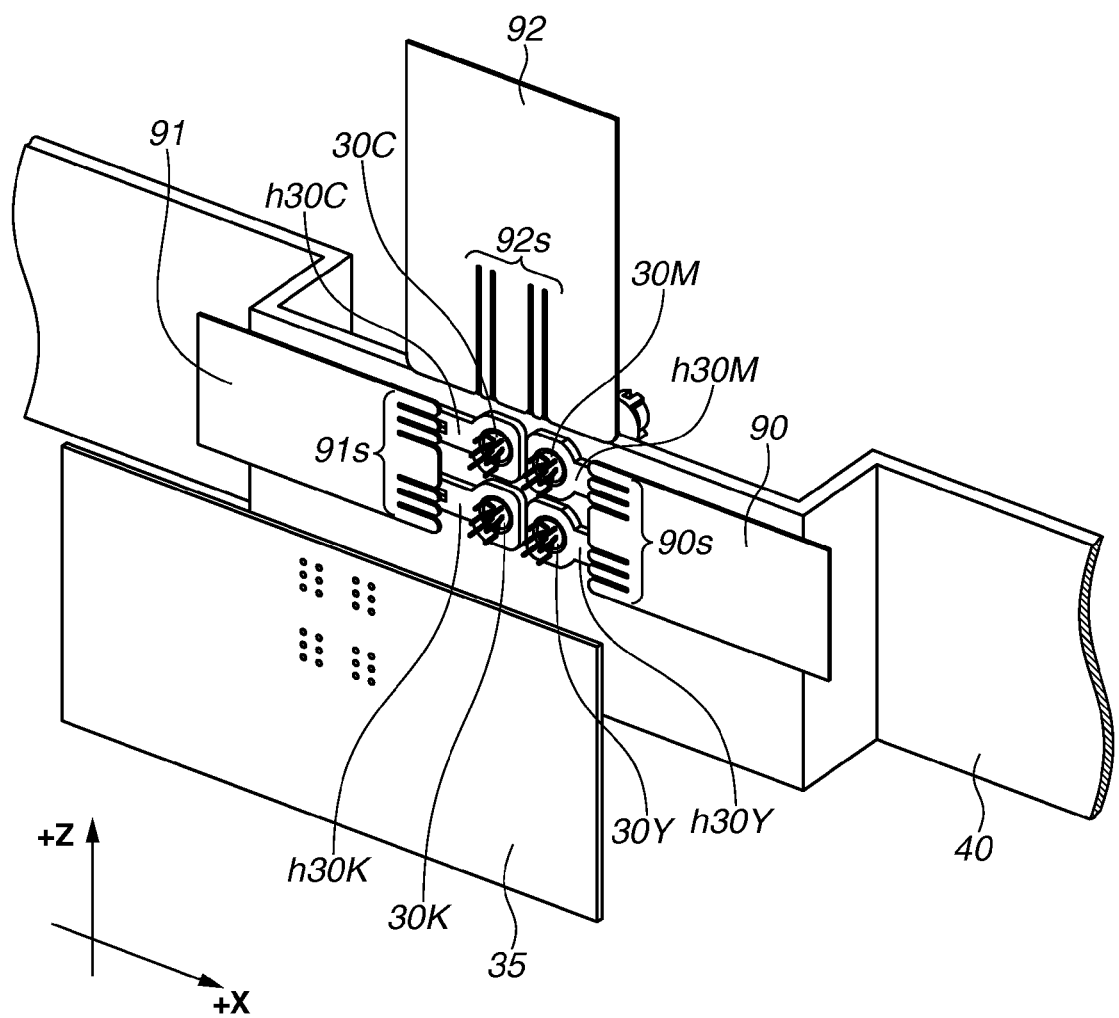
FIG. 7 is a perspective view of a portion of the optical scanning device where the laser driving circuit substrate is attached.
Figure 8:
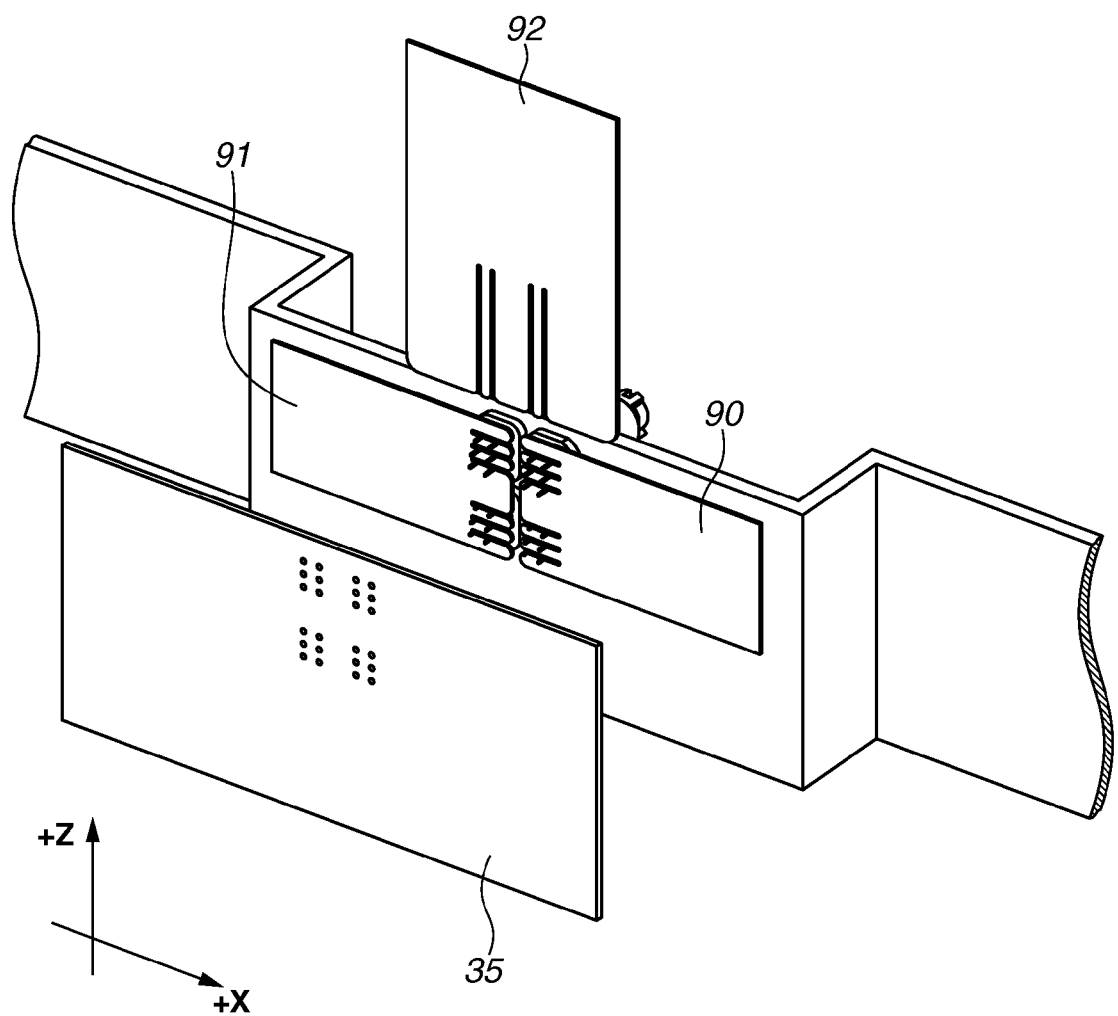
FIG. 8 is a perspective view of the portion of the optical scanning device where the laser driving circuit substrate is attached.
Figure 9:
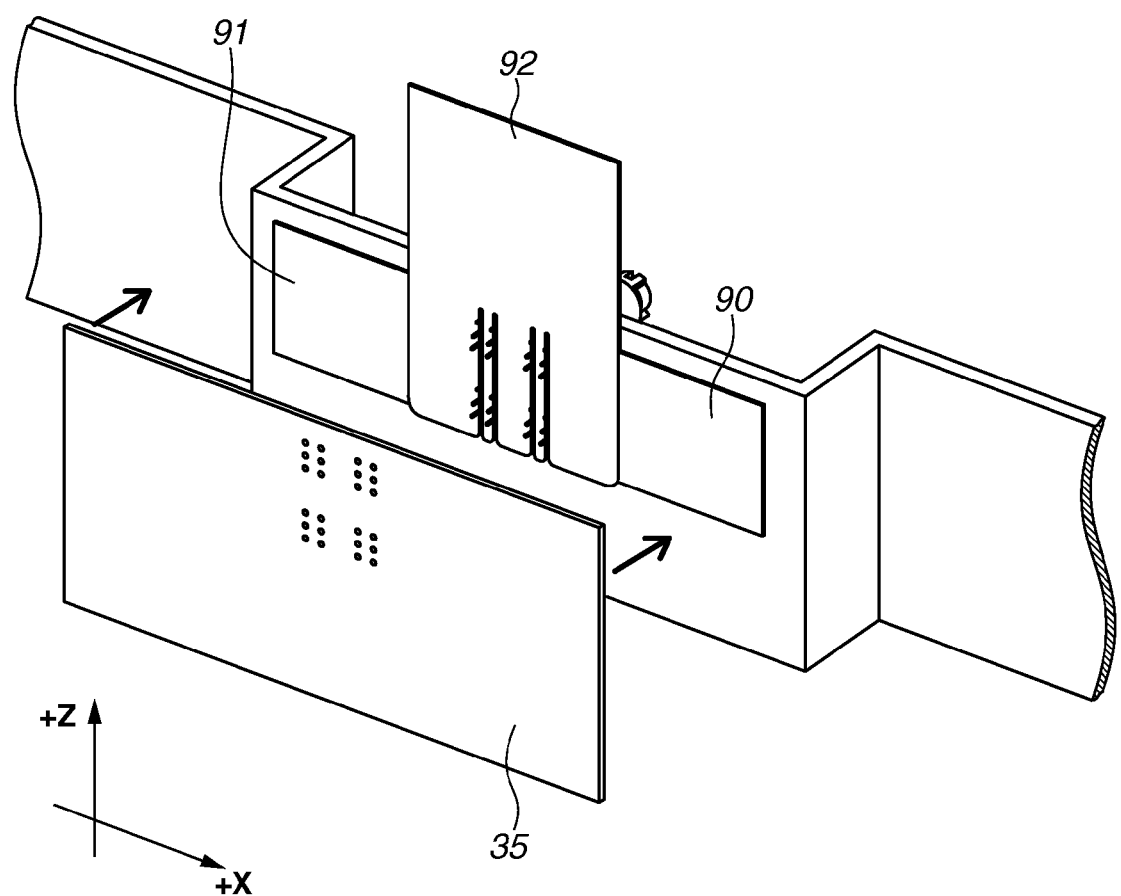
FIG. 9 is a perspective view of the portion of the optical scanning device where the laser driving circuit substrate is attached.

Next, a method for assembling the laser driving circuit substrate 35 will be described with reference to FIGS. 7 to 9, 14A, 14B, 15A, and 15B. FIGS. 7 to 9 are perspective views of a portion of the optical scanning device 3 where the laser driving circuit substrate 35 is attached. In the present exemplary embodiment, the laser driving circuit substrate 35 is assembled by simultaneously inserting a total of 24 lead pins into the lead pin holes 50, 60, 70, and 80 of the single laser driving circuit substrate 35 by using tools 90, 91, and 92. The tools 90, 91, and 92 each have a comb-like shape (in other words, have slits). The slits of the tools 90 and 91 are spaced according to the spacing of the lead pin holes in the Z direction. The slits of the tool 92 are spaced according to the spacing of the lead pin holes in the X direction.

As describe above, a light emitting member (semiconductor laser) having four light emitting points has six lead pins. Specifically, the six lead pins include a first lead pin 30LD1 intended for a first light emitting point, a second lead pin 30LD2 intended for a second light emitting point, a third lead pin 30LD3 intended for a third light emitting point, a fourth lead pin 30LD4 intended for a fourth light emitting point, a common lead pin 30COM shared by the four light emitting points, and a photodiode (PD) lead pin 30PD intended for a photodiode (see FIG. 15A).

Figure 14A:
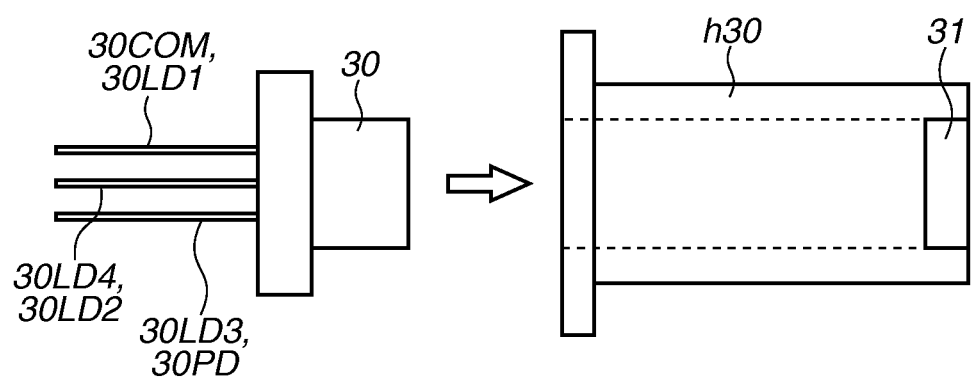
FIGS. 14A and 14B are diagrams for illustrating a process for attaching a semiconductor laser to a laser holder.
Figure 14B:
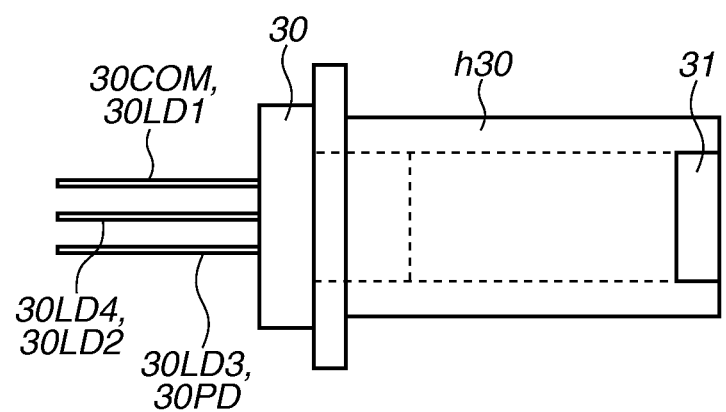
Figure 15A:
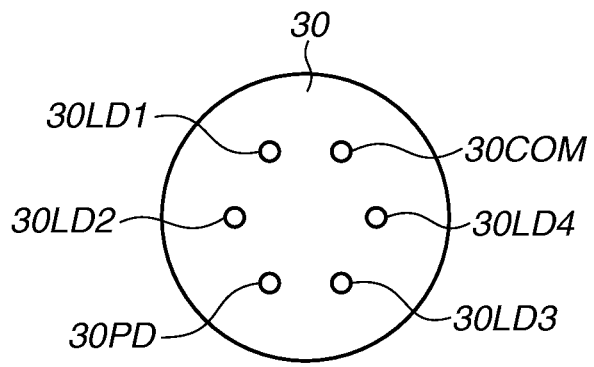
FIGS. 15A and 15B are diagrams for illustrating a process for aligning lead pins.
Figure 15B:
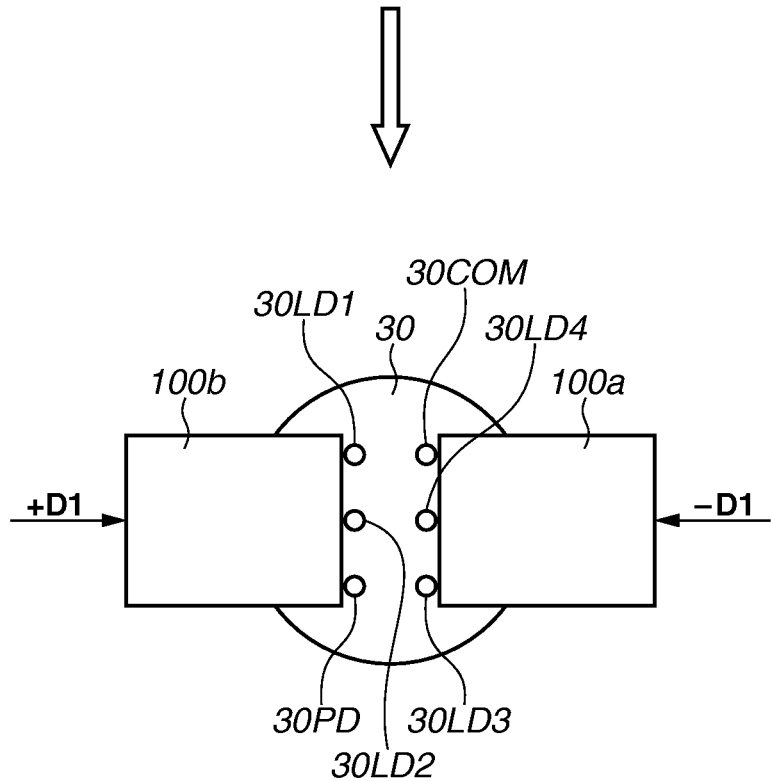

As illustrated in FIGS. 14A and 14B, each semiconductor laser 30 (30Y, 30M, 30C, and 30K) is initially fitted into a laser holder h30 (h30Y, h30M, h30C, and h30K). Next, as illustrated in FIG. 15B, at least one of all the lead pins of each semiconductor laser 30 is bent at the end in a direction +D1 (−D1) by using tools 100a and 100b, so that the lead pins are all aligned (into a 2×3 arrangement). Next, the four laser holders h30 to which the semiconductors 30 are attached are inserted into the optical box 40. The laser holders h30 are each adjusted in position and fixed to the optical box 40. As described above, the lead pins of the semiconductor lasers 30 are previously bent so as to fit into the lead pin holes 50, 60, 70, and 80 by using the tools 100a and 100b. Next, as illustrated in FIG. 8, the tools (first tools) 90 and 91 are moved in the X direction so that the lead pins are inserted into the slits that are formed in the first tools 90 and 91 and extending in the X direction. As illustrated in FIG. 7, the first tool 90 or 91 has three slits 90s or 91s for one semiconductor 30. The insertion of the lead pins into the slits 90s and 91s of the first tools 90 and 91 corrects positional displacements of the lead pins in the Z direction.

Next, as illustrated in FIGS. 7 and 9, the tool (second tool) 92 is moved in the Z direction so that the lead pins are inserted into slits 92s that are formed in the second tool 92 and extending in the Z direction. The second tool 92 has four slits 92s. The insertion of the lead pins into the slits 92s of the second tool 92 corrects positional displacements of the lead pins in the X direction. With the lead pins being inserted in the slits 90s, 91s, and 92s of the tools 90, 91, and 92, the laser driving circuit substrate 35 is moved in the Y direction (direction orthogonal to the X and Z directions) to insert the lead pins into the respective lead pin holes 50, 60, 70, and 80. The laser driving circuit substrate 35 is further fixed to the optical box 4, and the lead pins and the circuit pattern of the laser driving circuit substrate 35 are electrically connected by soldering, whereby the assembling is completed.

As described above, the method for assembling the optical scanning device 3 includes holding first and second light emitting members 30Y and 30M on the housing 40 of the optical scanning device 3. The method further includes chucking all the lead pins of the first and second light emitting members 30Y and 30M by the slits 90s of the first tool 90 which moves in a first direction (X direction). The method further includes chucking all the lead pins of the first and second light emitting members 30Y and 30M by slits 92s of the second tool 92 which moves in a second direction (Z direction) intersecting with the first direction. The method further includes inserting all the lead pins of the first and second light emitting members 30Y and 30M that are in the state of being chucked by the first and second tools 90 and 92, into respective holes provided in the laser driving circuit substrate 35. The method further includes retracting the first and second tools 90 and 92 from all the lead pins.

The method further includes bending at least one of all the lead pins to align all the lead pins before chucking all the lead pins by the first and second tools 90 and 92. In such a manner, arranging the lead pin holes corresponding to all the semiconductor lasers 30 in a 2×3 arrangement enables simultaneous positioning of the 24 lead pins of the four semiconductor leasers 30 by the operations of the tools 90, 91, and 92 only in the two directions, namely, the X and Z directions. Since the laser driving circuit substrate 35 can thus be assembled in a short time by using a simple tool configuration, the assembling steps can be shortened in time and complication of the assembling tools can be suppressed.

[Comparison with Comparative Example]

Figure 11A:
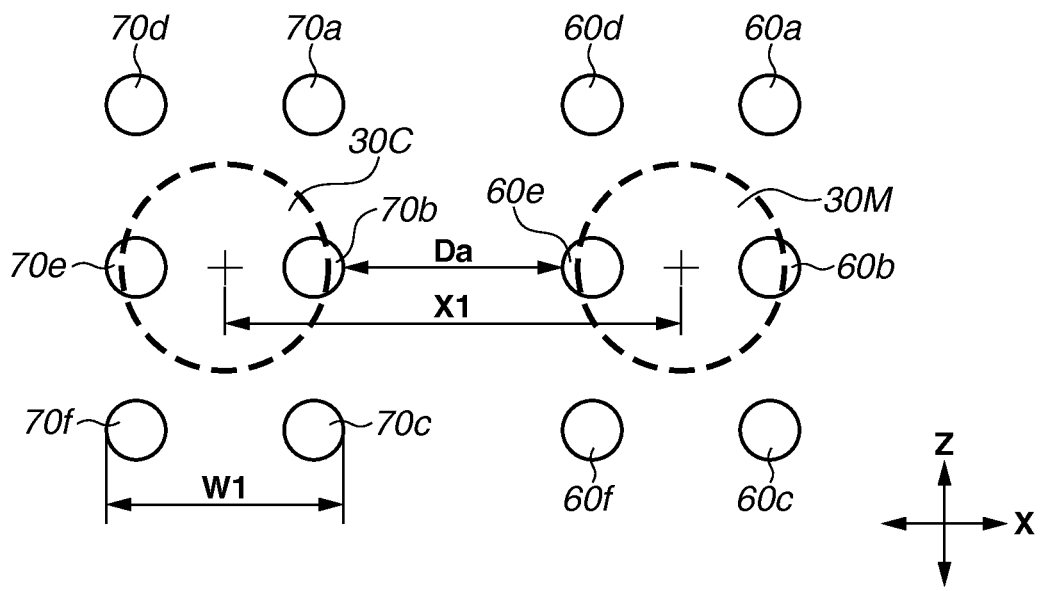
FIG. 11A is a diagram illustrating a relationship between lead pin holes in a surface of the laser driving circuit substrate and semiconductor lasers according to a first exemplary embodiment as viewed in a Y direction.
Figure 11B:
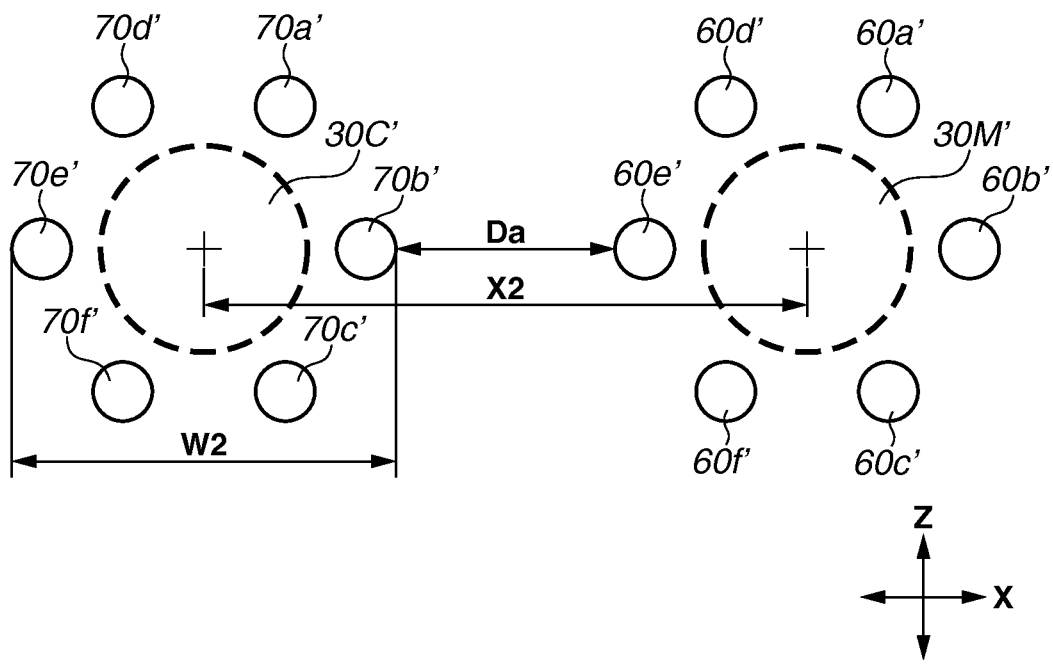
FIG. 11B is a diagram illustrating a relationship between lead pin holes in a surface of a laser driving circuit substrate and semiconductor lasers according to a comparative example as viewed in the Y direction.

FIG. 11A is a diagram illustrating a relationship between the lead pin holes 60 (60a to 60f) and 70 (70a to 70f) in the surface of the laser driving circuit substrate 35, and the semiconductor lasers 30C and 30M according to the present exemplary embodiment as viewed in the Y direction. FIG. 11B is a diagram illustrating a relationship between lead pin holes 60' (60a' to 60f') and 70' (70a' to 70f') in the surface of a laser driving circuit substrate, and semiconductor lasers 30C' and 30M' according to a comparative example as viewed in the Y direction.

In the present exemplary embodiment, with the 2×3 arrangement, the widths across the respective six lead pin holes 60 and 70 in the X direction can be set to W1. In the comparative example, the lead pin holes 60a' to 60f' and 70a' to 70f are simply arranged at equal distances circumferentially around the respective semiconductor lasers 30C' and 30M'. The widths across the respective six lead pin holes 60' and 70' in the X direction is thus W2 (W2>W1). Suppose that the shortest distance between the six lead pin holes 60 and the six lead pin holes 70 is Da. In the present exemplary embodiment, the center-to-center distance between the semiconductor lasers 30C and 30M which are arranged in the X direction (of which the arrangement direction is the X direction) can be set to X1. On the other hand, in the comparative example, the center-to-center distance is X2 (X2>X1). According to the present exemplary embodiment, the semiconductor lasers 30C and 30M arranged in the X direction can thus be arranged closer to each other in the X direction.

Figure 6:
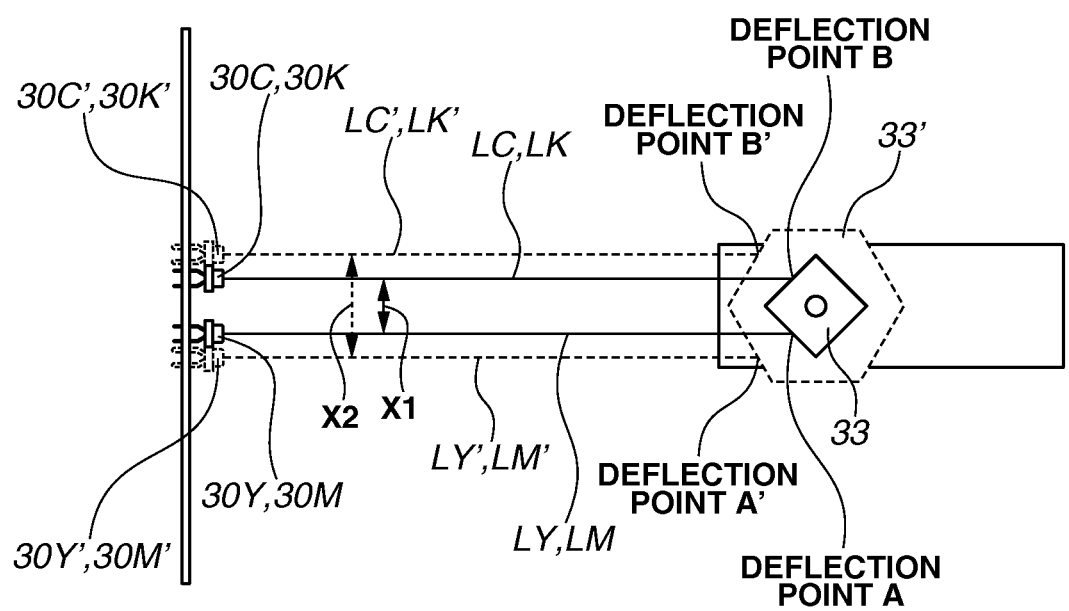
FIG. 6 is a main scanning sectional view illustrating incident optical systems.

FIG. 6 is a diagram illustrating the incident optical systems of the optical scanning device 3 as viewed in the Z direction (a main scanning sectional view illustrating the incident optical systems). In the comparative example, the semiconductor lasers (30C' and 30M', and 30K' and 30Y') can be only arranged as close as X2 in the center-to-center distance in the X direction. The distance between deflection points A' and B' therefore needs to be relatively large. To cause the laser beams L' to enter a common rotating polygonal mirror, a rotating polygonal mirror 33' having a relatively large circumscribed circle needs to be used.

On the other hand, in the present exemplary embodiment, the semiconductor lasers (30C and 30M, and 30K and 30Y) can be arranged as close as X1 in the center-to-center distance in the X direction. If the laser beams L are caused to enter a common rotating polygonal mirror, the distance between deflection points A and B can be relatively small. This allows the use of a rotating polygonal mirror 33 having a relatively small circumscribed circle, which can reduce the moment of inertia of the rotating polygonal mirror 33 to reduce a rise time of the motor 34. The miniaturization of the rotating polygonal mirror 33 also enables miniaturization and cost reduction of the optical scanning device 3.

[Modification]

Figure 12:
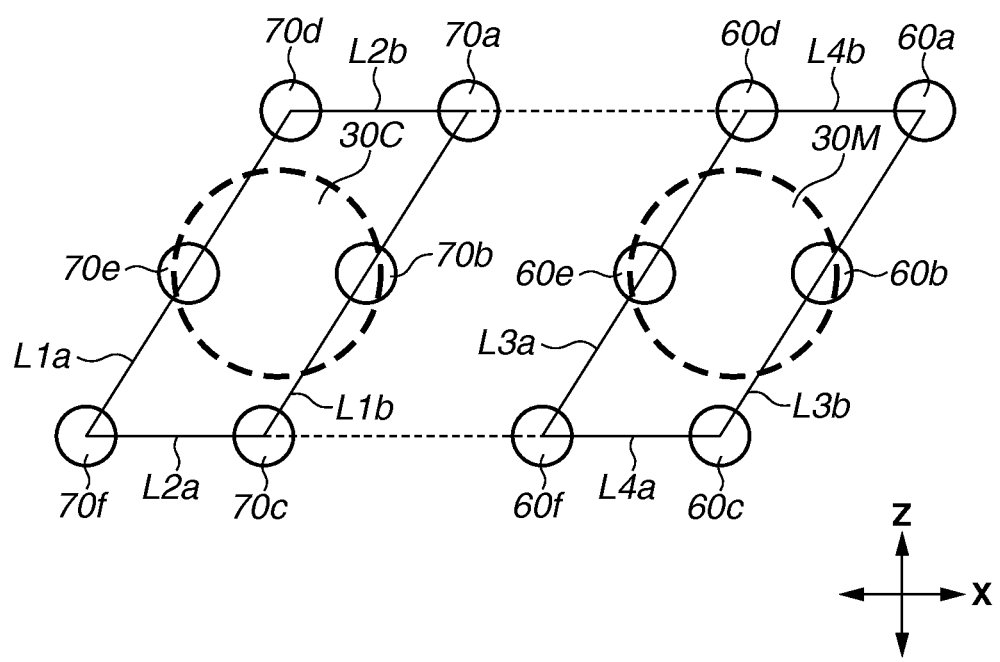
FIG. 12 is a diagram illustrating a relationship between lead pin holes in a surface of a laser driving circuit and semiconductor lasers according to a modification of the first exemplary embodiment as viewed in the Y direction.

Next, a modification of the present exemplary embodiment will be described. FIG. 12 is a diagram illustrating a relationship between the lead pin holes 60 (60a to 60f) and 70 (70a to 70f) in the surface of the laser driving circuit substrate 35 and the semiconductor lasers 30C and 30M when the modification of the present exemplary embodiment is viewed in the Y direction. In the modification, the lead pin holes corresponding to each semiconductor laser 30 are arranged in two in the X direction and in three in an intersecting direction that intersects with the X direction. In such a manner, the semiconductor lasers 30 arranged in the X direction can be arranged close to each other in the X direction even if the direction in which the three lead pin holes adjoin is not the Z direction.

The first exemplary embodiment and the modification will be described in a generalized manner with the lead pin holes corresponding to either one of two semiconductor lasers 30 arranged in the X direction as first holes and the lead pin holes corresponding to the other one as second holes. Line segments (L2a and L2b) each connecting two first holes (70c and 70f, or 70a and 70d) arranged in the X direction among the six first holes (70a to 70f) will be referred to as first short sides. Line segments (L1a and L1b) each connecting three first holes (70d, 70e, and 70f, or 70a, 70b, and 70c) arranged in an intersecting direction intersecting with the X direction among the six first holes will be referred to as first long sides. The six first holes are arranged to form a parallelogram having the first short sides and the first long sides. Line segments (L4a and L4b) each connecting two second holes (60c and 60f, or 60a and 60d) arranged in the X direction among the six second holes (60a to 60f) will be referred to as second short sides. Line segments (L3a and L3b) each connecting three second holes (60d, 60e, and 60f, or 60a, 60b, and 60c) arranged in the intersecting direction intersecting with the X direction among the six second holes will be referred to as second long sides. The six second holes are arranged to form a parallelogram having the second short sides and the second long sides. By such an arrangement of the lead pin holes, the semiconductor lasers 30 arranged in the X direction can be arranged close to each other in the X direction. Here, examples of the intersecting direction may include the Z direction which is a direction orthogonal to the X direction.

As described above, according to the present exemplary embodiment of the present invention, light emitting members having six lead pins can be closely arranged.

Figure 10:
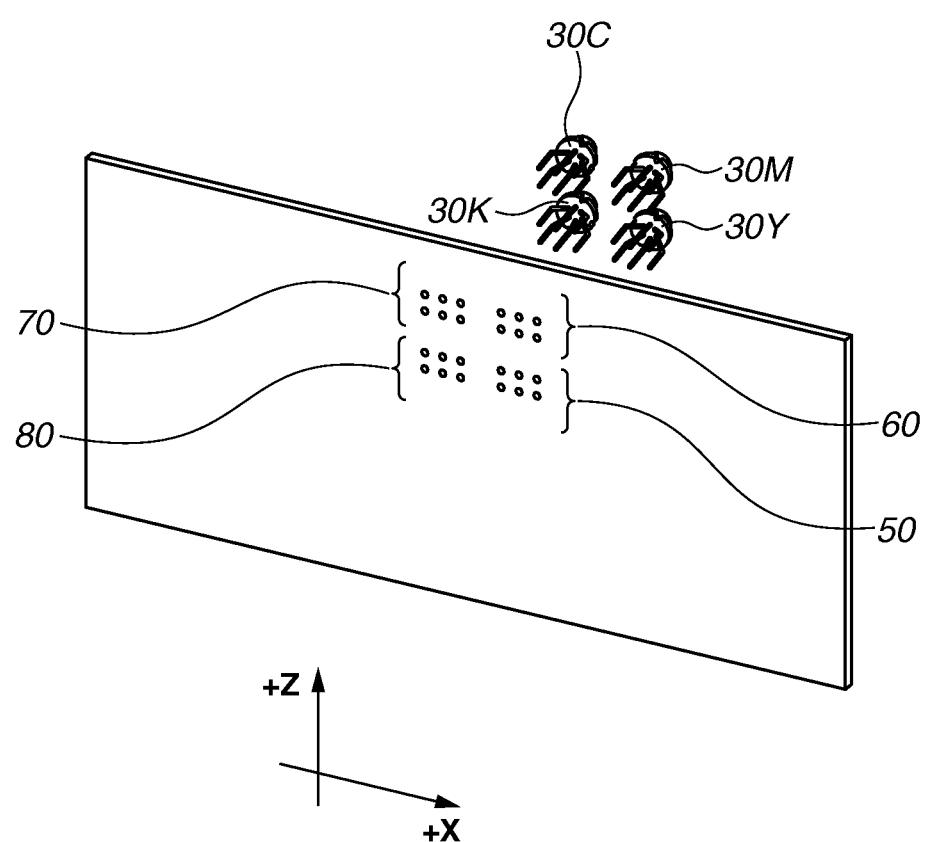
FIG. 10 is a perspective view illustrating a relationship between the laser driving circuit substrate and the semiconductor lasers.
Figure 13:
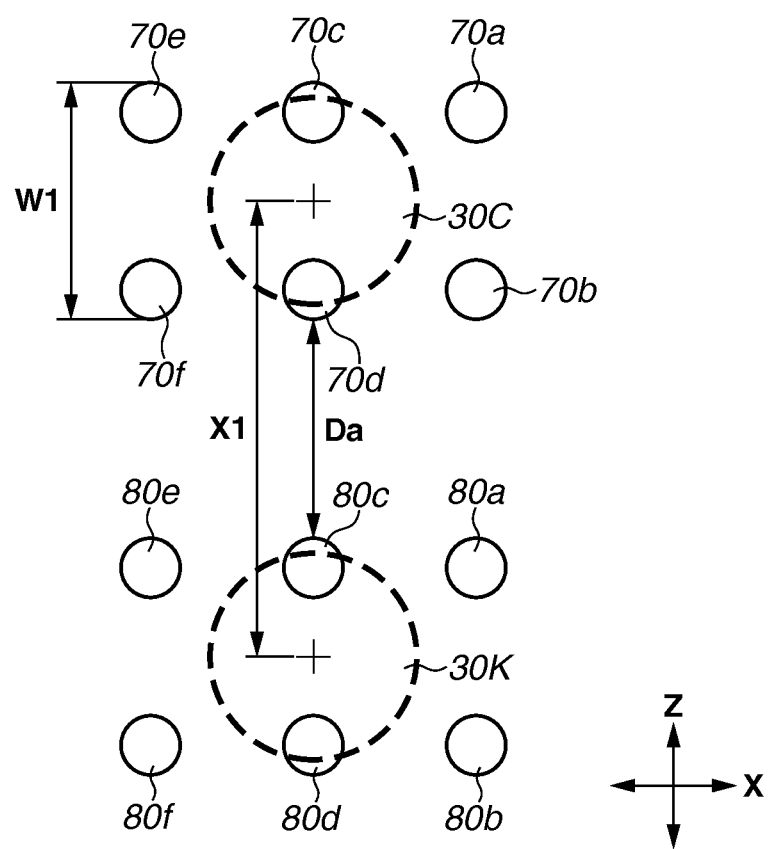
FIG. 13 is a diagram illustrating a relationship between lead pin holes in a surface of a laser driving circuit and semiconductor lasers according to a second exemplary embodiment as viewed in the Y direction.

A configuration according to a second exemplary embodiment will be described with reference to FIGS. 10 and 13. FIG. 10 is a perspective view illustrating a relationship between a laser driving circuit substrate 35 and semiconductor lasers 30Y, 30M, 30C, and 30K. FIG. 13 is a diagram illustrating a relationship between lead pin holes 70 (70a to 70f) and 80 (80a to 80f) in the surface of the laser driving circuit substrate 35 and the semiconductor lasers 30C and 30K according to the present exemplary embodiment as viewed in the Y direction. In the present exemplary embodiment, the lead pin holes are arranged in three in the X direction and in two in the Z direction. Such an arrangement will be referred to as a 3×2 arrangement. The lead pins of the semiconductor lasers 30Y, 30M, 30C, and 30K are previously bent and widened to fit into the lead pin holes 50, 60, 70, and 80 of 3×2 arrangement, and inserted into the lead pin holes 50, 60, 70, and 80. The rest of the functions and names related to the image forming apparatus and the optical scanning device are similar to those in the first exemplary embodiment. A description thereof will thus be omitted.

As illustrated in FIG. 4, when viewed in a sub scanning cross section, the laser beams L obliquely enter the rotating polygonal mirror 33 with incident angles of not zero but θa and θb. In such incident optical systems, uneven scanning (jitter) may occur in the main scanning direction due to an error in the tilt angles of the respective reflection surfaces of the rotating polygonal mirror 33. The smaller the angles θa and θb, the smaller the jitter is suppressed to be. In the present exemplary embodiment, as illustrated in FIG. 13, the 3×2 arrangement can reduce the center-to-center distance X1 between the semiconductor lasers 30M and 30C and the semiconductor lasers 30Y and 30K arranged in the Z direction. The angles θa and θb can thus be reduced to suppress the occurrence of jitter. In addition, the semiconductor lasers 30 can be closely arranged in the Z direction while widening the distances between the lead pin holes in the X and Z directions. This widens a space on the laser driving circuit substrate 35, facilitating soldering and a pattern layout.

Like the first exemplary embodiment, even with the 3×2 arrangement, a total of 24 lead pins of the adjoining four semiconductor lasers 30Y, 30M, 30C, and 30K can be simultaneously corrected by the tools 90, 91, and 92 by the operations only in the two directions, namely, the X and Z directions. The laser driving circuit substrate 35 can thus be easily assembled in a short time.

A generalized description will be given with the lead pin holes corresponding to either one of two semiconductor lasers 30 arranged in the Z direction as first holes and the lead pin holes corresponding to the other one as second holes. Line segments each connecting two first holes (70e and 70f, or 70a and 70b) arranged in the Z direction among the six first holes (70a to 70f) will be referred to as first short sides. Line segments each connecting three first holes (70a, 70c, and 70e, or 70b, 70d, and 70f) arranged in an intersecting direction intersecting with the Z direction among the six first holes will be referred to as first long sides. The six first holes are arranged to form a parallelogram having the first short sides and the first long sides. Line segments each connecting two second holes (80e and 80f, or 80a and 80b) arranged in the Z direction among the six second holes (80a to 80f) will be referred to as second short sides. Line segments each connecting three second holes (80*a*, 80*c*, and 80*e*, or 80*b*, 80*d*, and 80*f*) arranged in the intersecting direction intersecting with the Z direction among the six second holes will be referred to as second long sides. The six second holes are arranged to form a parallelogram having the second short sides and the second long sides. By such an arrangement of the lead pin holes, the semiconductor lasers 30 arranged in the Z direction can be arranged close to each other in the Z direction. Here, examples of the intersecting direction may include the X direction which is a direction orthogonal to the Z direction.

As described above, according to the present exemplary embodiment of the present invention, light emitting members having six lead pins can be closely arranged.

Figures 16A, 16B:
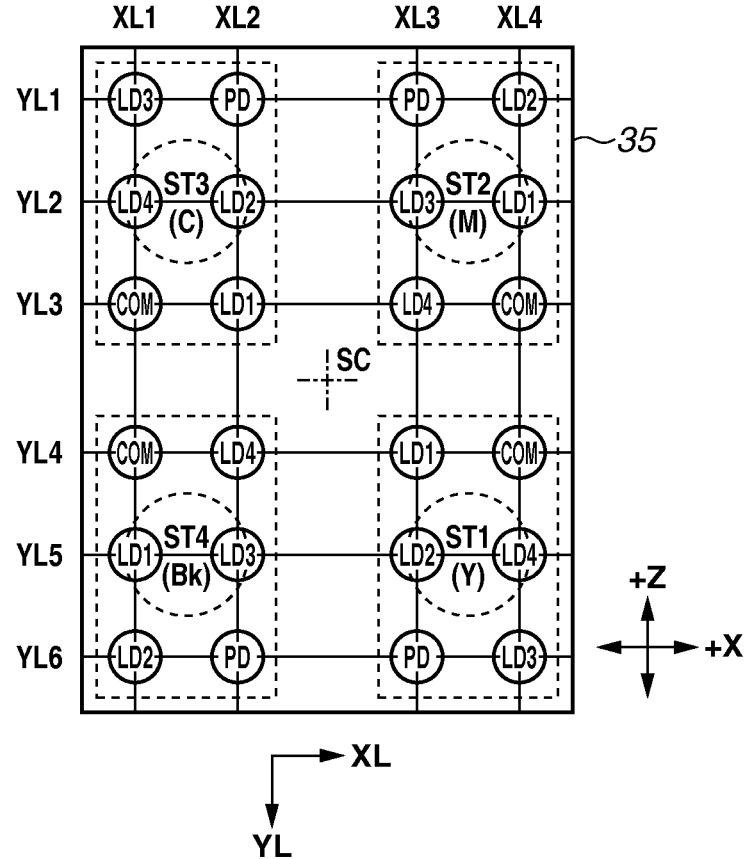
FIGS. 16A and 16B are explanatory diagrams illustrating a third exemplary embodiment.

FIG. 16A illustrates a relationship between the lead pins of the four semiconductor lasers 30Y to 30K of the optical scanning device 3 and holes of the laser driving circuit substrate 35 into which the lead pins are inserted, according to a third exemplary embodiment. The lead pins of the semiconductor laser 30Y are inserted into six holes ST1. The lead pins of the semiconductor laser 30M are inserted into six holes ST2. The lead pins of the semiconductor laser 30C are inserted into six holes ST3. The lead pins of the semiconductor laser 30K are inserted into six holes ST4. The center of the four semiconductor lasers 30 is designated by SC.

As described above, the six lead pins formed on a single semiconductor laser 30 include a first lead pin 30LD1, a second lead pin 30LD2, a third lead pin 30LD3, a fourth lead pin 30LD4, a common lead pin 30COM, and a PD lead pin 30PD.

As illustrated in FIG. 16A, the following positional relationships are all symmetrical about the center SC: a positional relationship between a hole LD1 into which the first read pin 30LD1 of the first light emitting member 30Y is inserted and a hole LD1 into which the first lead pin 30LD1 of the third light emitting member 30C is inserted; a positional relationship between a hole LD2 into which the second lead pin 30LD2 of the first light emitting member 30Y is inserted and a hole LD2 into which the second lead pin 30LD2 of the third light emitting member 30C is inserted; a positional relationship between a hole LD3 into which the third lead pin 30LD3 of the first light emitting member 30Y is inserted and a hole LD3 into which the third lead pin 30LD3 of the third light emitting member 30C is inserted; a positional relationship between a hole LD4 into which the fourth lead pin 30LD4 of the first light emitting member 30Y is inserted and a hole LD4 into which the fourth lead pin 30LD4 of the third light emitting member 30C is inserted; a positional relationship between a hole COM into which the common lead pin 30COM of the first light emitting member 30Y is inserted and a hole COM into which the common lead pin 30COM of the third light emitting member 30C is inserted; and a positional relationship between a hole PD into which the PD lead pin 30PD of the first light emitting member 30Y is inserted and a hole PD into which the PD lead pin 30PD of the third light emitting member 30C is inserted.

The six holes ST2 into which the lead pins of the second light emitting member 30M are inserted and the six holes ST4 into which the lead pins of the fourth light emitting member 30K are inserted are respectively symmetrical about the center SC, as well.

As illustrated in FIG. 16A, all the holes into which the lead pins are inserted are arranged to be located at intersections of virtual coordinates including four mutually-parallel first virtual straight lines XL1 to XL4, and six mutually-parallel second virtual straight lines YL1 to YL6 which intersect with the first virtual straight lines XL1 to XL4. In the present example, the virtual coordinates are of a Cartesian coordinate system.

All the 24 holes are arranged so that one of the 24 holes and any of other holes located at coordinates different from the coordinates where the one hole is located, in both a first direction (direction XL) in which the first virtual straight lines XL1 to XL4 are arranged and a second direction (direction YL) in which the second virtual straight lines YL1 to YL6 are arranged, do not overlap in either of the first and second directions. A specific description is given below.

FIG. 16B illustrates a substrate 35 according to a comparative example. The comparative example is also configured so that four semiconductor lasers each having six lead pins are attached to a single substrate 35. The configuration will be described with a focus on one of the 24 holes that is located at coordinates (XL1,YL3) (the black-filled hole illustrated in FIG. 16B; hereinafter, referred to as a hole of interest). In FIG. 16B, the holes illustrated by solid lines are ones each located at a coordinate identical to either one of the coordinates (XL1,YL3) where the hole of interest is located, in at least either one of the first and second directions XL and YL. For example, the hole located at coordinates (XL2,YL3) is identical to the hole of interest in position in the second direction YL.

On the other hand, in FIG. 16B, the holes illustrated by broken lines are ones located at positions different from the coordinates (XL1,YL3) where the hole of interest is located, in both the directions XL and YL. Of the 17 holes illustrated by the broken lines, the one located at coordinates (XL1', YL2) and the one located at coordinates (XL1',YL5) overlap with the hole of interest in the direction XL (hatched portion). With such a hole arrangement as illustrated in FIG. 16B, the lead pins are difficult to chuck by the tools 90 to 92 illustrated in FIG. 7.

In contrast, in the present exemplary embodiment, all the 24 holes are arranged so that one of the 24 holes and any of other holes located at coordinates different from the coordinates where the one hole is located, in both the first and second directions XL and YL, do not overlap in either of the first and second directions XL and YL. The hole arrangement of the present example illustrated in FIG. 16A facilitates chucking by the tools 90 to 92 and improves assemblability.

Figure 17A:
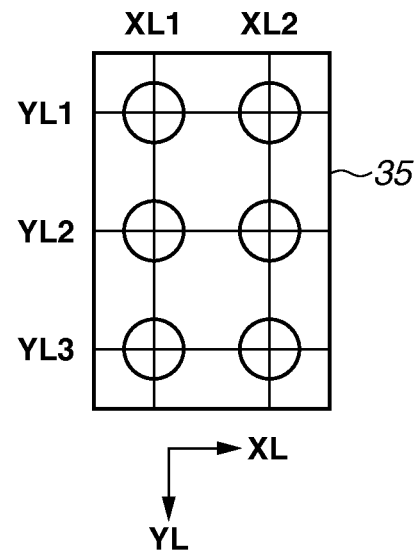
FIGS. 17A and 17B are diagrams illustrating modifications of the third exemplary embodiment.
Figure 17B:
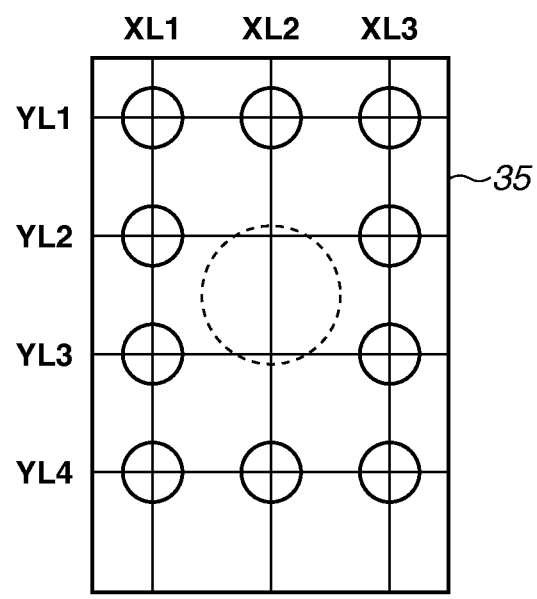

The present example has dealt with the configuration where four semiconductor lasers each having six lead pins are attached to a single substrate. Alternatively, FIG. 17A illustrates a configuration in which a single semiconductor laser (four-beam laser) having six lead pins is attached to a single substrate. FIG. 17B illustrates a configuration in which a single semiconductor laser (eight-beam laser) having ten lead pins is attached to a single substrate. Such configurations are also applicable. In short, it is sufficient that, in an optical scanning device on which a light emitting member including four or more laser emitting units and six or more lead pins is mounted, six or more holes are all arranged so that one of the six or more holes and any of other holes located at coordinates different from the coordinates where the one hole is located, in both a first direction in which first virtual straight lines are arranged and a second direction in which second virtual straight lines are arranged, do not overlap in either of the first and second directions.

Figure 18A:
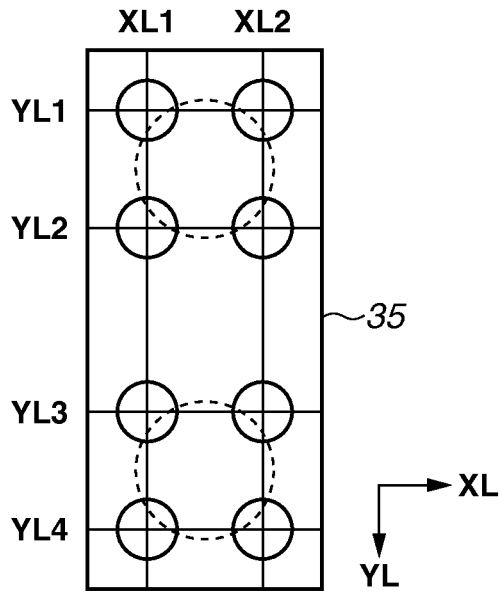
FIGS. 18A, 18B, 18C, and 18D are diagrams illustrating modifications of the third exemplary embodiment.
Figure 18C:
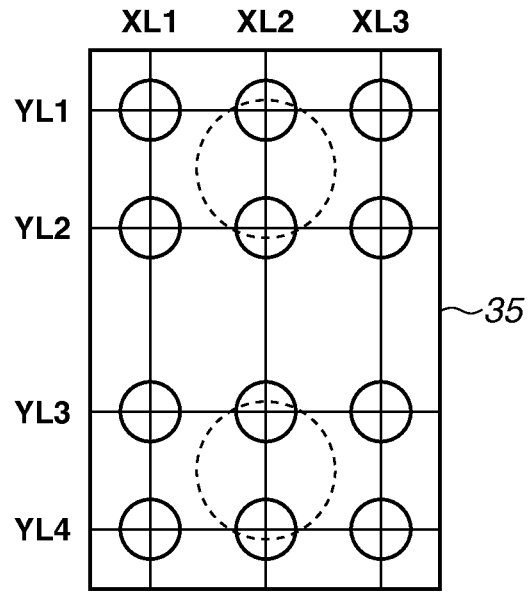
Figure 18B:
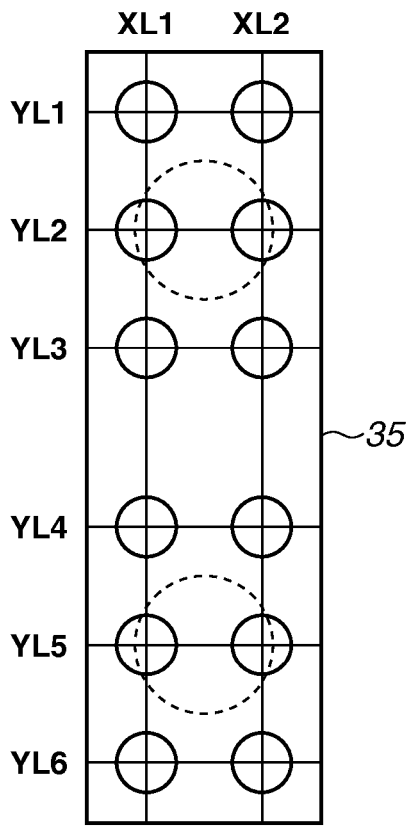
Figure 18D:
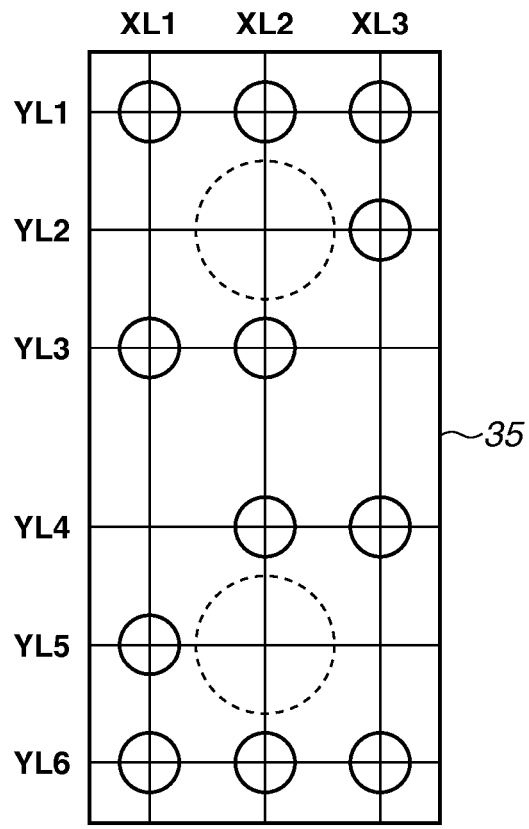
Figure 19A:
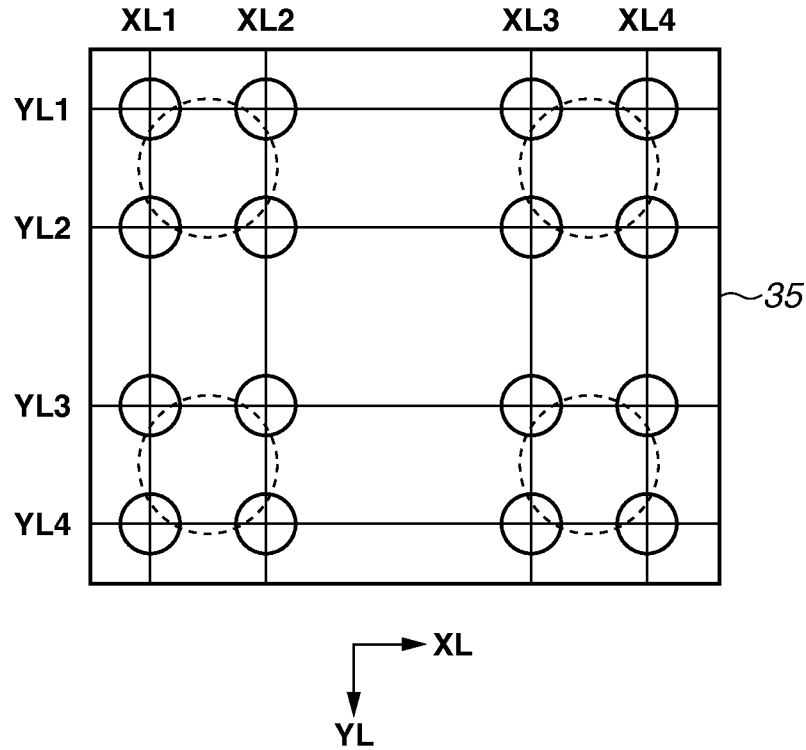
FIGS. 19A and 19B are diagrams illustrating modifications of the third exemplary embodiment.
Figure 19B:
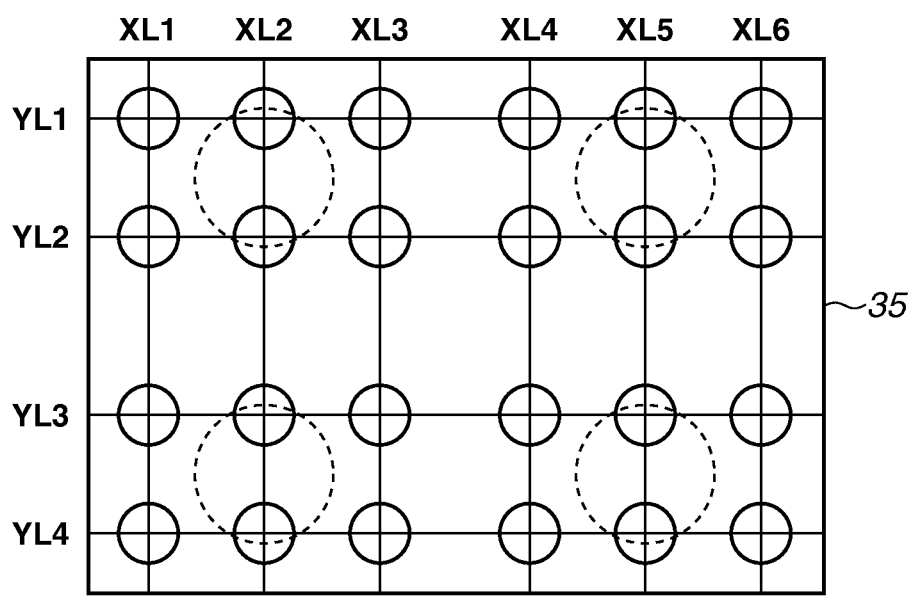

In addition, FIG. 18A illustrates a configuration in which two semiconductor lasers (two-beam lasers) each having four lead pins are attached to a single substrate. FIGS. 18B, 18C, and 18D illustrate configurations in which two semiconductor lasers (four-beam lasers) each having six lead pins are attached to a single substrate. Such configurations are also applicable. Furthermore, FIG. 19A illustrates a configuration in which four semiconductor lasers (two-beam lasers) each having four lead pins are attached to a single substrate. FIG. 19B illustrates a configuration in which four semiconductor lasers (four-beam lasers) each having six lead pins are attached to a single substrate. Such configurations are also applicable. In short, it is sufficient that, in an optical scanning device on which first and second light emitting members each including two or more laser emitting units and four or more lead pins are mounted, eight or more holes are all arranged so that one of the eight or more holes and any of other holes located at coordinates different from the coordinates where the one hole is located, in both a first direction in which first virtual straight lines are arranged and a second direction in which second virtual straight lines are arranged, do not overlap in either of the first and second direction.

Among the examples illustrated in FIGS. 16A to 19B, a substrate having the following configuration is particularly desirable. Specifically, a substrate desirably has such a configuration that all lead pin insertion holes corresponding to one semiconductor laser (for example, all of six holes in the case of a four-beam laser) are arranged so as to form a parallelogram (rectangle in the case of a Cartesian coordinate system). When a plurality of semiconductor lasers is mounted on a single substrate, in a similar manner to the above, a substrate desirably has such a configuration that, in each of the plurality of semiconductor lasers, all the corresponding lead pin insertion holes are arranged so as to form a parallelogram. More specifically, the hole arrangements illustrated in FIGS. 16A, 17A, 17B, 18A, 18B, 18C, 19A, and 19B are desirable. With such arrangements, a tool with a small number of slits can be used, so that lead pins can be easily chucked by the tool.

The holes of the substrates described above are located at the coordinates of intersections of a Cartesian coordinate system. However, the first direction and the second direction do not need to be orthogonal. An oblique coordinate system may also be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-146037, filed Jul. 16, 2014, and No. 2015-107879 filed May 27, 2015, which are hereby incorporated by reference herein in their entirety.

What is claimed is:

1. An optical scanning device, comprising:
first, second, third, and fourth light emitting members, each including two or more laser emitting units and four or more lead pins;
a laser driving substrate including sixteen or more holes into which all of the lead pins of the four light emitting members are respectively inserted; and
a deflection scanning unit configured to reflect laser beams respectively emitted from the four light emitting members to perform deflection scanning,
wherein all the sixteen or more holes into which the sixteen or more lead pins are inserted are arranged to be located at intersections of virtual coordinates including at least four mutually-parallel first virtual straight lines and at least four mutually-parallel second virtual straight lines intersecting with the first virtual straight lines,
wherein all the sixteen or more holes are arranged so that one of the sixteen or more holes and any of other holes located at coordinates different from coordinates where the one hole is located, in both a first direction in which the first virtual straight lines are arranged and a second direction in which the second virtual straight lines are arranged, do not overlap in either of the first and second directions,
wherein the first to fourth light emitting members each include at least a first lead pin intended for a first light emitting point, a second lead pin intended for a second light emitting point, a common lead pin shared by the first and second light emitting points, and a photodiode (PD) lead pin intended for a photodiode, and
wherein
a positional relationship between a hole into which the first lead pin of the first light emitting member is inserted and a hole into which the first lead pin of the third light emitting member is inserted,
a positional relationship between a hole into which the second lead pin of the first light emitting member is inserted and a hole into which the second lead pin of the third light emitting member is inserted,
a positional relationship between a hole into which the common lead pin of the first light emitting member is inserted and a hole into which the common lead pin of the third light emitting member is inserted, and
a positional relationship between a hole into which the PD lead pin of the first light emitting member is inserted and a hole into which the PD lead pin of the third light emitting member is inserted are all symmetrical about a point.

2. The optical scanning device according to claim 1, wherein the virtual coordinates are of a Cartesian coordinate system.

* * * * *